United States Patent
Shih et al.

(10) Patent No.: US 10,939,118 B2
(45) Date of Patent: Mar. 2, 2021

(54) LUMA-BASED CHROMA INTRA-PREDICTION METHOD THAT UTILIZES DOWN-SAMPLED LUMA SAMPLES DERIVED FROM WEIGHTING AND ASSOCIATED LUMA-BASED CHROMA INTRA-PREDICTION APPARATUS

(71) Applicant: MEDIATEK INC., Hsin-Chu (TW)

(72) Inventors: Cheng-Hsuan Shih, Hsinchu (TW); Jian-Liang Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/658,173

(22) Filed: Oct. 21, 2019

(65) Prior Publication Data

US 2020/0137394 A1  Apr. 30, 2020

Related U.S. Application Data

(60) Provisional application No. 62/750,846, filed on Oct. 26, 2018.

(51) Int. Cl.
*H04N 19/136* (2014.01)
*H04N 19/115* (2014.01)
(Continued)

(52) U.S. Cl.
CPC ......... *H04N 19/136* (2014.11); *H04N 19/115* (2014.11); *H04N 19/117* (2014.11);
(Continued)

(58) Field of Classification Search
CPC .. H04N 19/115; H04N 19/117; H04N 19/136; H04N 19/149; H04N 19/176;
(Continued)

(56) References Cited

U.S. PATENT DOCUMENTS 9,609,343 B1 * 3/2017 Chen ................... H04N 19/159
10,368,094 B2 * 7/2019 Budagavi ............. H04N 19/117
(Continued)

FOREIGN PATENT DOCUMENTS

| CN | 103782596 A | 5/2014 |
| WO | 2017/139937 A1 | 8/2017 |
| WO | 2018/053293 A1 | 3/2018 |

OTHER PUBLICATIONS

"International Search Report" dated Jan. 8, 2020 for International application No. PCT/CN2019/112941, International filing date:Oct. 24, 2019.

*Primary Examiner* — Peter D Le
(74) *Attorney, Agent, or Firm* — Winston Hsu

(57) ABSTRACT

A luma-based chroma intra-prediction method includes: applying, by a filter circuit with a first weighting table, weighting to reconstructed luma samples to generate a first down-sampled luma sample, wherein the reconstructed luma samples are external to a luma block; computing parameters of a linear model, wherein a pair of the first down-sampled luma sample and a reconstructed chroma sample that is external to a chroma block is involved in computing the parameters of the linear model; and determining a predicted value of a chroma sample included in the chroma block according to the linear model and a second down-sampled luma sample that is derived from the luma block.

11 Claims, 13 Drawing Sheets

(51) Int. Cl.
*H04N 19/176* (2014.01)
*H04N 19/80* (2014.01)
*H04N 19/186* (2014.01)
*H04N 19/117* (2014.01)
*H04N 19/149* (2014.01)

(52) U.S. Cl.
CPC ......... *H04N 19/149* (2014.11); *H04N 19/176* (2014.11); *H04N 19/186* (2014.11); *H04N 19/80* (2014.11)

(58) Field of Classification Search
CPC .... H04N 19/186; H04N 19/59; H04N 19/593; H04N 19/80
See application file for complete search history.

(56) References Cited

U.S. PATENT DOCUMENTS

| | | | | |
|---|---|---|---|---|
| 10,715,830 B2* | 7/2020 | Budagavi | | H04N 19/80 |
| 2007/0086521 A1* | 4/2007 | Wang | | H04N 19/51 |
| | | | | 375/240.1 |
| 2007/0217516 A1* | 9/2007 | Zhang | | H04N 19/523 |
| | | | | 375/240.17 |
| 2011/0273610 A1* | 11/2011 | Tay | | H04N 5/23212 |
| | | | | 348/345 |
| 2012/0287995 A1* | 11/2012 | Budagavi | | H04N 19/593 |
| | | | | 375/240.12 |
| 2012/0328013 A1* | 12/2012 | Budagavi | | H04N 19/59 |
| | | | | 375/240.12 |
| 2013/0101024 A1* | 4/2013 | Van der Auwera | | |
| | | | | H04N 19/186 |
| | | | | 375/240.03 |
| 2013/0136174 A1* | 5/2013 | Xu | | H04N 19/11 |
| | | | | 375/240.12 |
| 2013/0188703 A1* | 7/2013 | Liu | | H04N 19/503 |
| | | | | 375/240.12 |
| 2013/0188705 A1* | 7/2013 | Liu | | H04N 19/593 |
| | | | | 375/240.12 |
| 2016/0277762 A1* | 9/2016 | Zhang | | H04N 19/167 |
| 2017/0150186 A1* | 5/2017 | Zhang | | H04N 19/573 |
| 2017/0359595 A1* | 12/2017 | Zhang | | H04N 19/593 |
| 2018/0048889 A1* | 2/2018 | Zhang | | H04N 19/96 |
| 2018/0077426 A1* | 3/2018 | Zhang | | H04N 19/117 |
| 2018/0139443 A1* | 5/2018 | Park | | H04N 19/14 |
| 2018/0176594 A1* | 6/2018 | Zhang | | H04N 19/11 |
| 2018/0176595 A1* | 6/2018 | Park | | H04N 19/105 |
| 2018/0332292 A1* | 11/2018 | Lin | | H04N 19/159 |
| 2019/0042874 A1* | 2/2019 | Possos | | G06N 5/003 |
| 2020/0288135 A1* | 9/2020 | Laroche | | H04N 19/117 |

* cited by examiner

LUMA-BASED CHROMA INTRA-PREDICTION METHOD THAT UTILIZES DOWN-SAMPLED LUMA SAMPLES DERIVED FROM WEIGHTING AND ASSOCIATED LUMA-BASED CHROMA INTRA-PREDICTION APPARATUS

CROSS REFERENCE TO RELATED APPLICATIONS

This application claims the benefit of U.S. provisional application No. 62/750,846, filed on Oct. 26, 2018 and incorporated herein by reference.

BACKGROUND

The present invention relates to intra prediction of video encoding/decoding, and more particularly, to a luma-based chroma intra-prediction method that utilizes down-sampled luma samples derived from weighting and an associated luma-based chroma intra-prediction apparatus.

The conventional video coding standards generally adopt a block based coding technique to exploit spatial and temporal redundancy. For example, the basic approach is to divide the whole source frame into a plurality of blocks, perform prediction on each block, transform residuals of each block, and perform quantization, scan and entropy encoding. Besides, a reconstructed frame is generated in an internal decoding loop of the video encoder to provide reference pixel data used for coding following blocks. For example, inverse scan, inverse quantization, and inverse transform may be included in the internal decoding loop of the video encoder to recover residuals of each block that will be added to predicted samples of each block for generating a reconstructed frame. The functions of the internal decoding loop of the video encoder are also implemented in a video decoder for recovering residuals of each block and generating a reconstructed frame.

When an intra-prediction mode is selected for encoding a block, an intra-prediction function of a video encoder is enabled for determining a predicted block. Similarly, when an intra-prediction mode is selected for decoding a block, an intra-prediction function of a video decoder is enabled for determining a predicted block. The encoding may be performed for each color component forming the pixels of the video data. Although RGB (Red-Green-Blue) representation is well-known, the YUV representation is preferably used for the encoding to reduce the inter-channel redundancy. However, inter-channel correlation is still observed locally. Thus, there is a need for an innovative intra-prediction design which is capable of taking advantage of the inter-channel correlation for coding efficiency enhancement.

SUMMARY

One of the objectives of the claimed invention is to provide a luma-based chroma intra-prediction method that utilizes down-sampled luma samples derived from weighting and an associated luma-based chroma intra-prediction apparatus.

According to a first aspect of the present invention, an exemplary luma-based chroma intra-prediction method is disclosed. The exemplary luma-based chroma intra-prediction method includes: applying, by a filter circuit with a first weighting table, weighting to reconstructed luma samples to generate a first down-sampled luma sample, wherein the reconstructed luma samples are external to a luma block; computing parameters of a linear model, wherein a pair of the first down-sampled luma sample and a reconstructed chroma sample that is external to a chroma block is involved in computing the parameters of the linear model; and determining a predicted value of a chroma sample included in the chroma block according to the linear model and a second down-sampled luma sample that is derived from the luma block.

According to a second aspect of the present invention, an exemplary luma-based chroma intra-prediction method is disclosed. The exemplary luma-based chroma intra-prediction method includes: applying, by a filter circuit with a weighting table, weighting to reconstructed luma samples included in a luma block to generate a down-sampled luma sample; and determining a predicted value of a chroma sample included in a chroma block according to a linear model and the down-sampled luma sample.

According to a third aspect of the present invention, an exemplary luma-based chroma intra-prediction method is disclosed. The exemplary luma-based chroma intra-prediction method includes: computing parameters of a linear model by utilizing only N down-sampled luma samples that are derived from reconstructed luma samples external to a 2N×2N luma block and only N reconstructed chroma samples that are external to an N×N chroma block, where N is a positive integer; and determining predicted values of chroma samples included in the N×N chroma block according to the linear model and down-sampled luma samples that are derived from the 2N×2N luma block.

According to a fourth aspect of the present invention, an exemplary luma-based chroma intra-prediction apparatus is disclosed. The exemplary luma-based chroma intra-prediction apparatus includes a filter circuit and a parameter derivation circuit. The filter circuit is arranged to employ a first weighting table for applying weighting to reconstructed luma samples to generate a first down-sampled luma sample, wherein the reconstructed luma samples are external to a luma block. The parameter derivation circuit is arranged to compute parameters of a linear model, wherein a pair of the first down-sampled luma sample and a reconstructed chroma sample that is external to a chroma block is involved in computing the parameters of the linear model. The chroma intra-prediction circuit is arranged to determine a predicted value of a chroma sample included in the chroma block according to the linear model and a second down-sampled luma sample that is derived from the luma block.

According to a fifth aspect of the present invention, an exemplary luma-based chroma intra-prediction apparatus is disclosed. The exemplary luma-based chroma intra-prediction apparatus includes a filter circuit and a chroma intra-prediction circuit. The filter circuit is arranged to employ a weighting table for applying weighting to reconstructed luma samples included in a luma block to generate a down-sampled luma sample. The chroma intra-prediction circuit is arranged to determine a predicted value of a chroma sample included in a chroma block according to a linear model and the down-sampled luma sample.

According to a sixth aspect of the present invention, an exemplary luma-based chroma intra-prediction method is disclosed. The exemplary luma-based chroma intra-prediction method includes a parameter derivation circuit and a chroma intra-prediction circuit. The parameter derivation circuit is arranged to compute parameters of a linear model by utilizing only N down-sampled luma samples that are derived from reconstructed luma samples external to a 2N×2N luma block and only N reconstructed chroma samples that are external to an N×N chroma block, where N is a positive integer. The chroma intra-prediction circuit is arranged to determine predicted values of chroma samples included in the N×N chroma block according to the linear model and down-sampled luma samples that are derived from the 2N×2N luma block.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
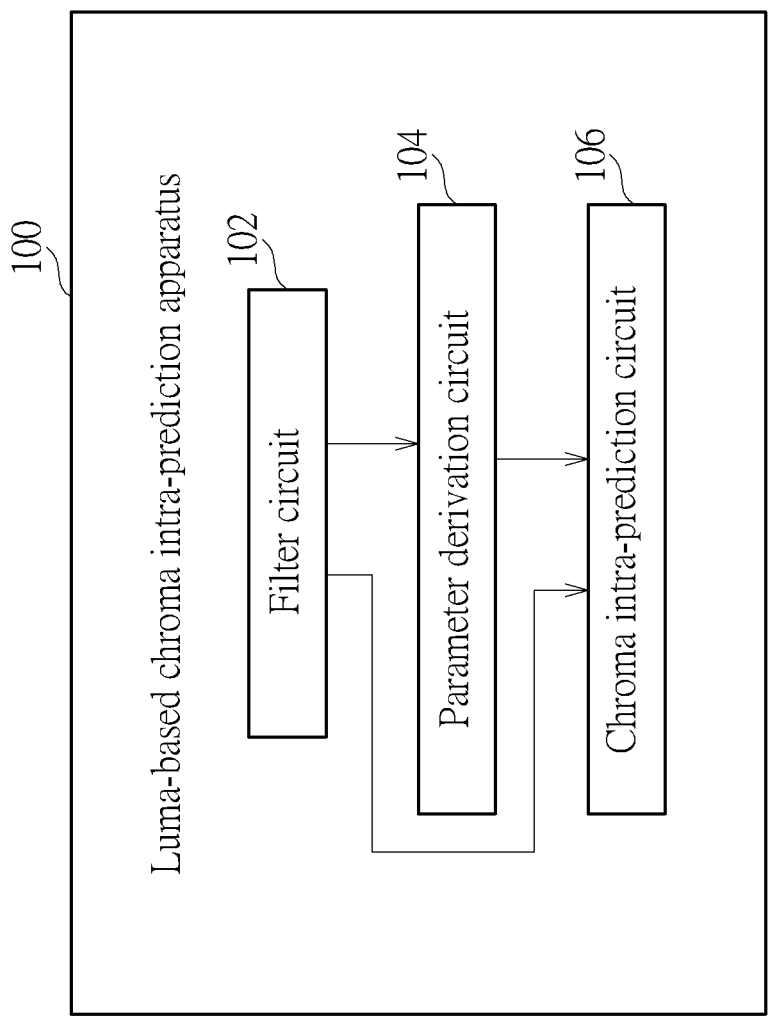
FIG. 1 is a diagram illustrating a luma-based chroma intra-prediction apparatus according to an embodiment of the present invention.

FIG. 1 is a diagram illustrating a luma-based chroma intra-prediction apparatus according to an embodiment of the present invention. For example, the luma-based chroma intra-prediction apparatus 100 may be a part of an intra-prediction circuit included in a video encoder. For another example, the luma-based chroma intra-prediction apparatus 100 may be a part of an intra-prediction circuit included in a video decoder. The luma-based chroma intra-prediction apparatus 100 includes a filter circuit 102, a parameter derivation circuit 104, and a chroma intra-prediction circuit 106. The parameter derivation circuit 104 is arranged to compute parameters of a linear model used for chroma intra-prediction. It is known to reduce the size of the video data to encode without significant degradation of visual rendering by sub-sampling the chroma components. For example, luma and chroma components have different sampling ratios in YUV420. When a cross-component linear model (CCLM) mode is selected for intra-prediction, the luma-based chroma intra-prediction apparatus 100 may determine predicted values of chroma samples in a chroma block according to a linear model and down-sampled reconstructed luma samples derived from a luma block, where the luma block and the chroma block belong to the same block of video. The linear model is used to predict chroma from luma, and relies on a slope parameter ($\alpha$) and an offset parameter ($\beta$). Specifically, a chroma sample $C(x, y)$ can by predicted from a luma sample $L(x, y)$ by using the linear model with the parameters ($\alpha$, $\beta$). For example, the linear model may be expressed using the following formula.

$$C(x,y) = \alpha \times L(x,y) + \beta$$

Figure 2:
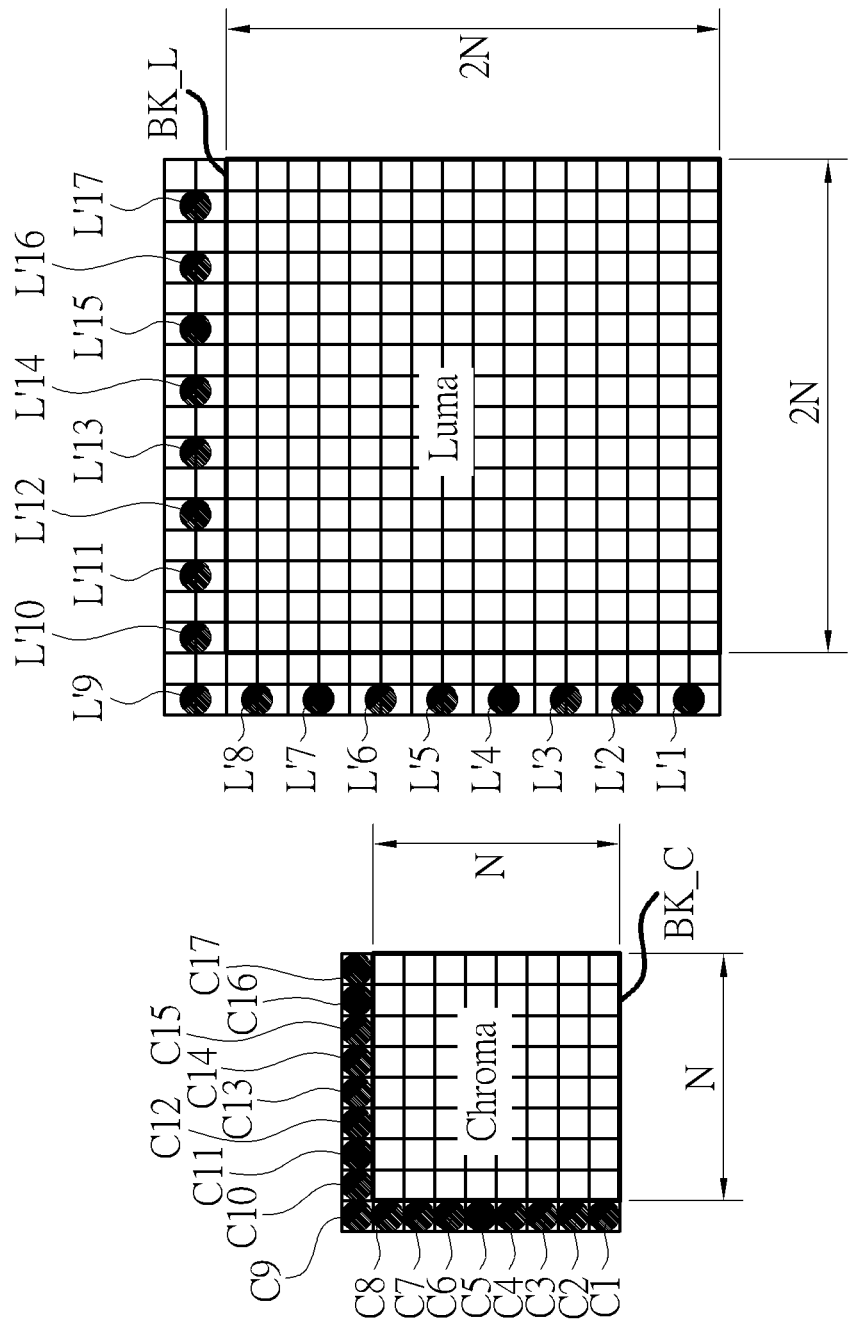
FIG. 2 is a diagram illustrating a first sample set used by the luma-based chroma intra-prediction apparatus shown in FIG. 1 to derive parameters of a linear model.

The parameters ($\alpha$, $\beta$) of the linear model are determined on the basis of sample pairs, each including one reconstructed chroma sample and one down-sampled reconstructed luma sample. FIG. 2 is a diagram illustrating a first sample set used by the luma-based chroma intra-prediction apparatus 100 to derive the parameters ($\alpha$, $\beta$) of the linear model. The reconstructed chroma samples C1-C17 around an N×N chroma block BK_C are selected for linear model parameter derivation, where N is a positive integer. Specifically, reconstructed chroma samples C1-C9 are located left to the left boundary of the N×N chroma block BK_C, and reconstructed chroma samples C9-C17 are located above the top boundary of the N×N chroma block BK_C. In the situation where the video data are chroma-subsampled, a 2N×2N luma block BK_L corresponding to the N×N chroma block BK_C is bigger than N×N. Hence, reconstructed luma samples around the 2N×2N luma block BK_L are down-sampled to match the chroma resolution. As shown in FIG. 2, the down-sampled luma samples L'1-L'17 around the 2N×2N luma block BK_L are selected for linear model parameter derivation. In one embodiment of the present invention, each of the down-sampled luma samples L'1-L'17 is determined by the filter circuit 102 through applying weighting to reconstructed luma samples. Further details of the filter circuit 102 that acts as an interpolation filter are described later. The sample pairs (L'1, C1), (L'2, C2), (L'3, C3), (L'4, C4), (L'5, C5), (L'6, C6), (L'7, C7), (L'8, C8), (L'9, C9), (L'10, C10), (L'11, C11), (L'12, C12), (L'13, C13), (L'14, C14), (L'15, C15), (L'16, C16), and (L'17, C17) are used by the parameter derivation circuit 104 for determining the slope parameter ($\alpha$) and the offset parameter ($\beta$). For example, a least mean square (LMS) algorithm may be used to derive the parameters ($\alpha$, $\beta$) of the linear model expressed in the above formula.

Figure 3:
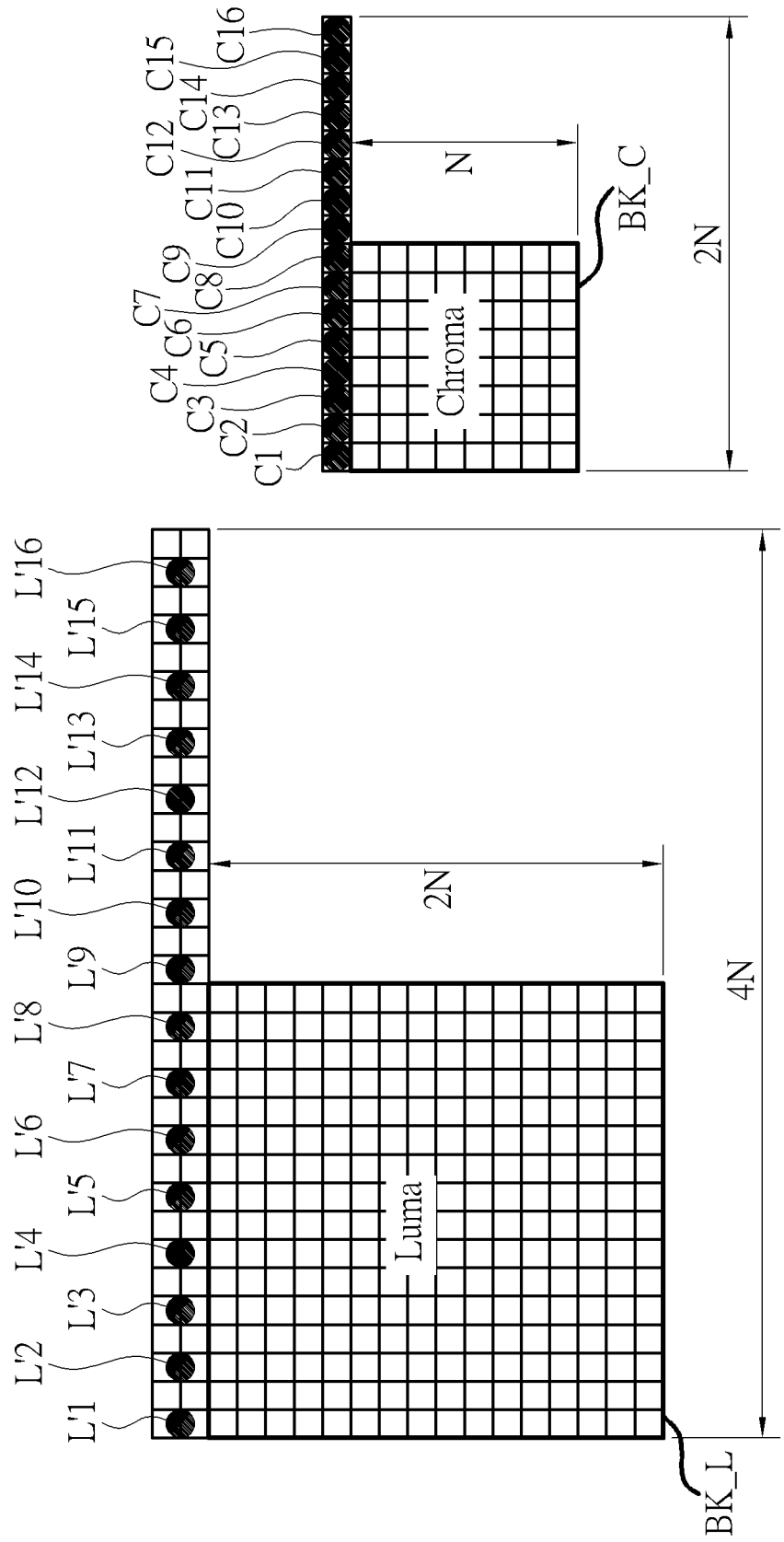
FIG. 3 is a diagram illustrating a second sample set used by the luma-based chroma intra-prediction apparatus shown in FIG. 1 to derive parameters of a linear model.

FIG. 3 is a diagram illustrating a second sample set used by the luma-based chroma intra-prediction apparatus 100 to derive the parameters ($\alpha$, $\beta$) of the linear model. The reconstructed chroma samples C1-C16 above an N×N chroma block BK_C are selected for linear model parameter derivation, where N is a positive integer. In the situation where the video data are chroma-subsampled, a 2N×2N luma block BK_L corresponding to the N×N chroma block BK_C is bigger than N×N. Hence, reconstructed luma samples above the 2N×2N luma block BK_L are down-sampled to match the chroma resolution. As shown in FIG. 3, the down-sampled luma samples L'1-L'16 above the 2N×2N luma block BK_L are selected for linear model parameter derivation. In one embodiment of the present invention, each of the down-sampled luma samples L'1-L'16 is determined by the filter circuit 102 through applying weighting to reconstructed luma samples. Further details of the filter circuit 102 that acts as an interpolation filter are described later. The sample pairs (L'1, C1), (L'2, C2), (L'3, C3), (L'4, C4), (L'5, C5), (L'6, C6), (L'7, C7), (L'8, C8), (L'9, C9), (L'10, C10), (L'11, C11), (L'12, C12), (L'13, C13), (L'14, C14), (L'15, C15), and (L'16, C16) are used by the parameter derivation circuit 104 for determining the slope parameter ($\alpha$) and the offset parameter ($\beta$). For example, an LMS algorithm may be used to derive the parameters ($\alpha$, $\beta$) of the linear model expressed in the above formula.

Figure 4:
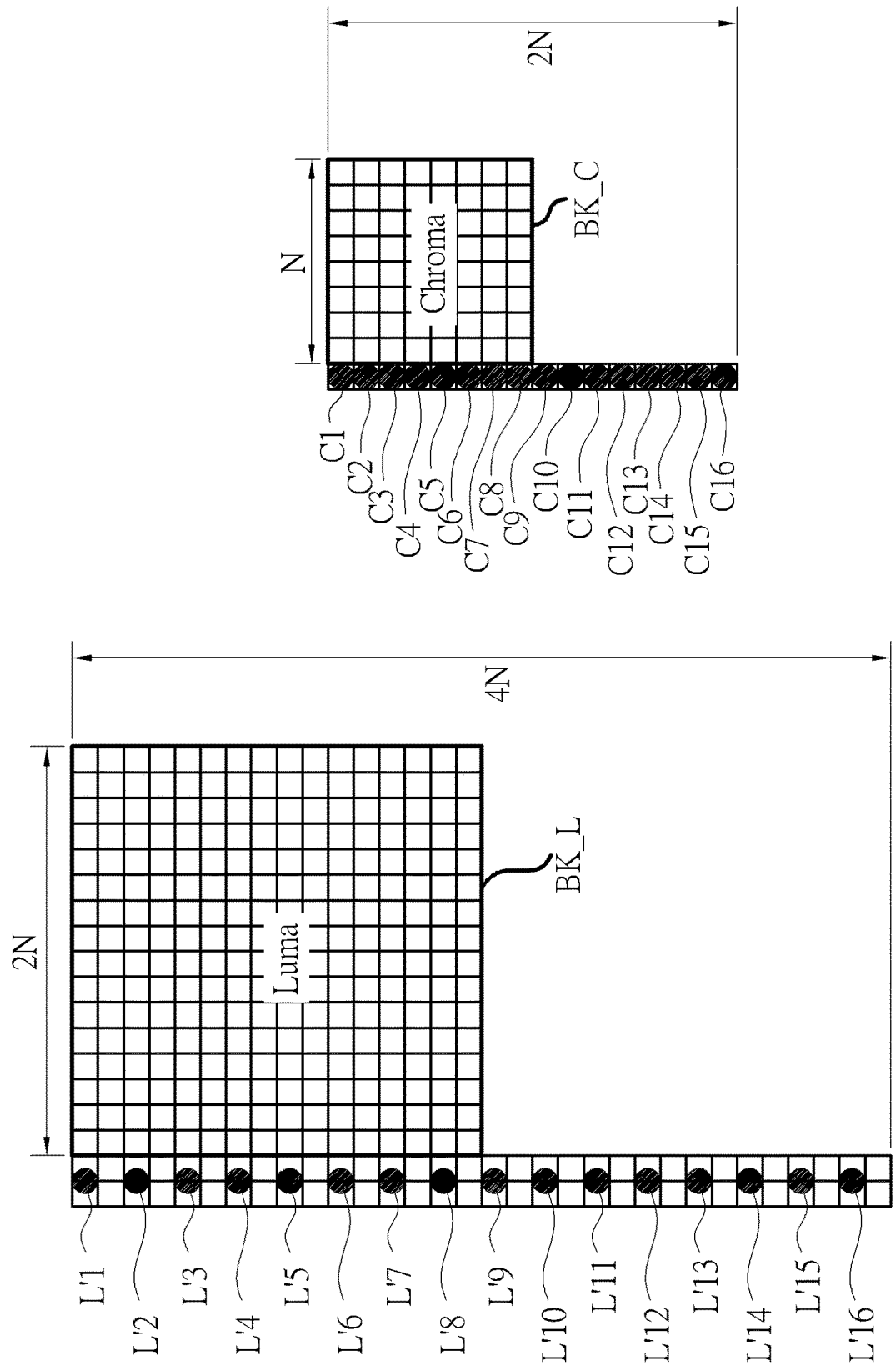
FIG. 4 is a diagram illustrating a third sample set used by the luma-based chroma intra-prediction apparatus shown in FIG. 1 to derive parameters of a linear model.

FIG. 4 is a diagram illustrating a third sample set used by the luma-based chroma intra-prediction apparatus 100 to derive the parameters ($\alpha$, $\beta$) of the linear model. The reconstructed chroma samples C1-C16 located left to an N×N chroma block BK_C are selected for linear model parameter derivation, where N is a positive integer. In the situation where the video data are chroma-subsampled, a 2N×2N luma block BK_L corresponding to the N×N chroma block BK_C is bigger than N×N. Hence, reconstructed luma samples located left to the 2N×2N luma block BK_L are down-sampled to match the chroma resolution. As shown in FIG. 4, the down-sampled luma samples L'1-L'16 located left to the 2N×2N luma block BK_L are selected for linear model parameter derivation. In one embodiment of the present invention, each of the down-sampled luma samples L'1-L'16 is determined by the filter circuit 102 through applying weighting to reconstructed luma samples. Further details of the filter circuit 102 that acts as an interpolation filter are described later. The sample pairs (L'1, C1), (L'2, C2), (L'3, C3), (L'4, C4), (L'5, C5), (L'6, C6), (L'7, C7), (L'8, C8), (L'9, C9), (L'10, C10), (L'11, C11), (L'12, C12), (L'13, C13), (L'14, C14), (L'15, C15), and (L'16, C16) are used by the parameter derivation circuit 104 for determining the slope parameter ($\alpha$) and the offset parameter ($\beta$). For example, an LMS algorithm may be used to derive the parameters ($\alpha$, $\beta$) of the linear model expressed in the above formula.

Figure 5:
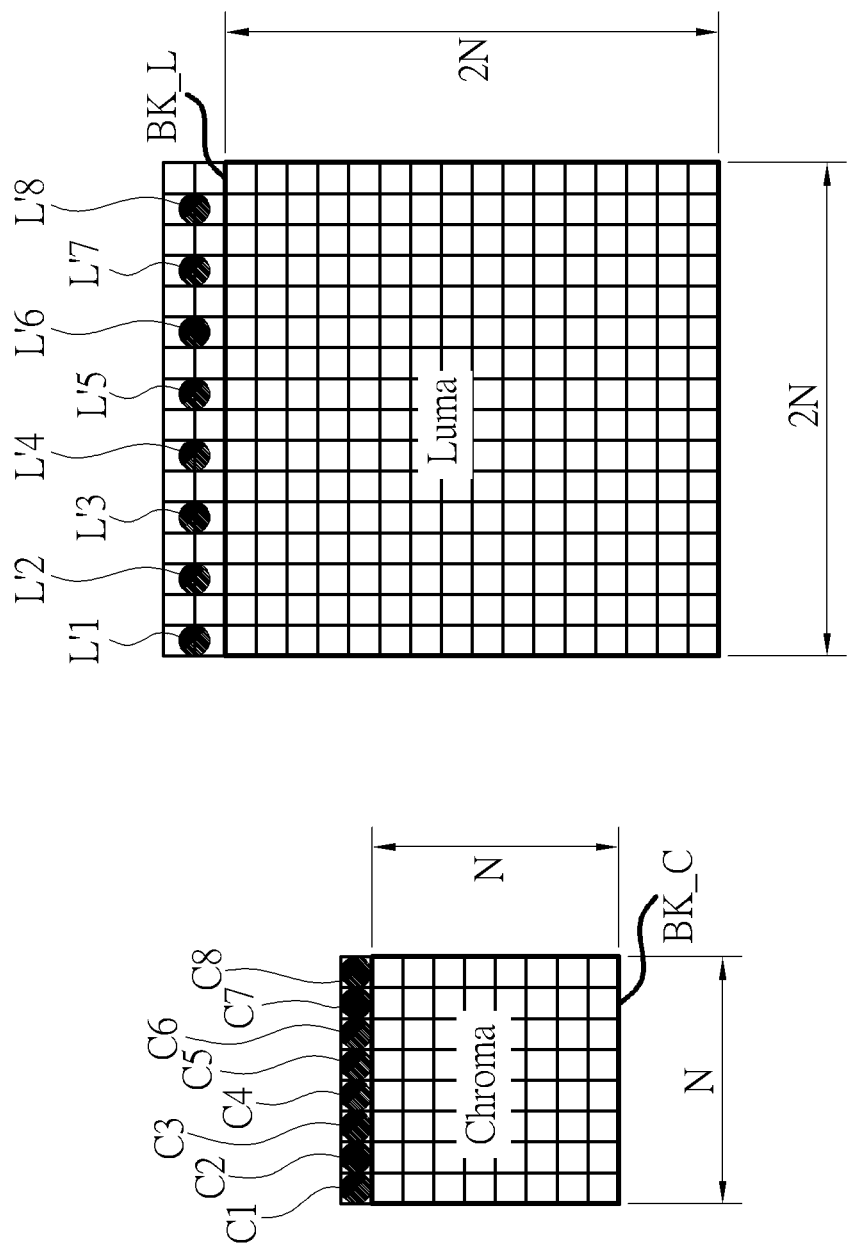
FIG. 5 is a diagram illustrating a fourth sample set used by the luma-based chroma intra-prediction apparatus shown in FIG. 1 to derive parameters of a linear model.

FIG. 5 is a diagram illustrating a fourth sample set used by the luma-based chroma intra-prediction apparatus 100 to derive the parameters ($\alpha$, $\beta$) of the linear model. The reconstructed chroma samples C1-C8 located above an N×N chroma block BK_C are selected for linear model parameter derivation, where N is a positive integer. In the situation where the video data are chroma-subsampled, a 2N×2N luma block BK_L corresponding to the N×N chroma block BK_C is bigger than N×N. Hence, reconstructed luma samples located above the 2N×2N luma block BK_L are down-sampled to match the chroma resolution. As shown in FIG. 5, the down-sampled luma samples L'1-L'8 located above the 2N×2N luma block BK_L are selected for linear model parameter derivation. In one embodiment of the present invention, each of the down-sampled luma samples L'1-L'8 is determined by the filter circuit 102 through applying weighting to reconstructed luma samples. Further details of the filter circuit 102 that acts as an interpolation filter are described later. It should be noted that only N down-sampled luma samples L'1-L'8 (which may be derived from reconstructed luma samples external to the 2N×2N luma block BK_L) and only N reconstructed chroma samples C1-C8 (which may be external to the N×N chroma block BK_C) are used by the parameter derivation circuit 104 for computing parameters of the linear model. Specifically, the sample pairs (L'1, C1), (L'2, C2), (L'3, C3), (L'4, C4), (L'5, C5), (L'6, C6), (L'7, C7), and (L'8, C8) are used for determining the slope parameter ($\alpha$) and the offset parameter ($\beta$). For example, an LMS algorithm may be used to derive the parameters ($\alpha$, $\beta$) of the linear model expressed in the above formula.

Figure 6:
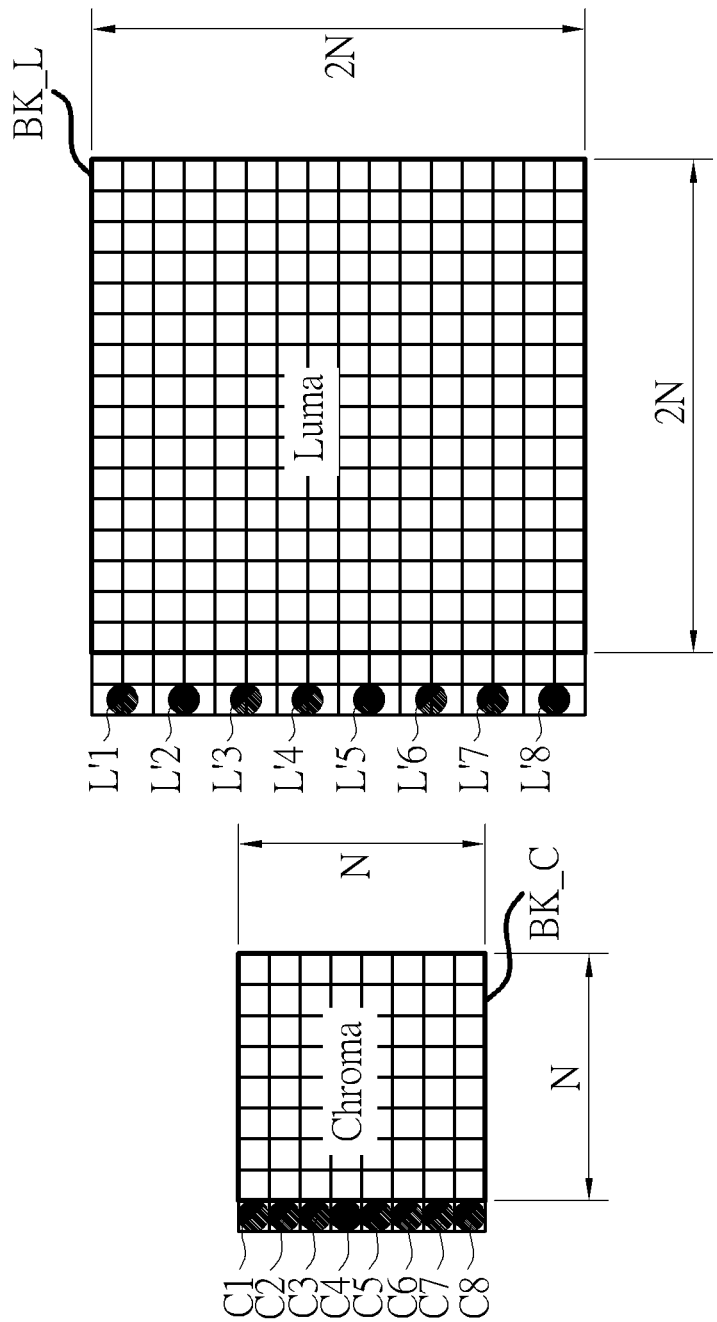
FIG. 6 is a diagram illustrating a fifth sample set used by the luma-based chroma intra-prediction apparatus shown in FIG. 1 to derive parameters of a linear model.

FIG. 6 is a diagram illustrating a fifth sample set used by the luma-based chroma intra-prediction apparatus 100 to derive the parameters ($\alpha$, $\beta$) of the linear model. The reconstructed chroma samples C1-C8 located left to an N×N chroma block BK_C are selected for linear model parameter derivation, where N is a positive integer. In the situation where the video data are chroma-subsampled, a 2N×2N luma block BK_L corresponding to the N×N chroma block BK_C is bigger than N×N. Hence, reconstructed luma samples located left to the 2N×2N luma block BK_L are down-sampled to match the chroma resolution. As shown in FIG. 6, the down-sampled luma samples L'1-L'8 located left to the 2N×2N luma block BK_L are selected for linear model parameter derivation. In one embodiment of the present invention, each of the down-sampled luma samples L'1-L'8 is determined by the filter circuit 102 through applying weighting to reconstructed luma samples. Further details of the filter circuit 102 that acts as an interpolation filter are described later. It should be noted that only N down-sampled luma samples L'1-L'8 (which may be derived from reconstructed luma samples external to the 2N×2N luma block BK_L) and only N reconstructed chroma samples C1-C8 (which may be external to the N×N chroma block BK_C) are used by the parameter derivation circuit 104 for computing parameters of the linear model. Specifically, the sample pairs (L'1, C1), (L'2, C2), (L'3, C3), (L'4, C4), (L'5, C5), (L'6, C6), (L'7, C7), and (L'8, C8) are used for determining the slope parameter ($\alpha$) and the offset parameter ($\beta$). For example, an LMS algorithm may be used to derive the parameters ($\alpha$, $\beta$) of the linear model expressed in the above formula.

After the slope parameter ($\alpha$) and the offset parameter ($\beta$) of the linear model are determined, the chroma intra-prediction circuit 106 is arranged to determine a predicted value of a chroma sample included in a chroma block (e.g., N×N chroma block BK_C) according to the linear model and a down-sampled luma sample that is derived from a luma block (e.g., 2N×2N luma block BK_L). The same weighting concept may be employed for generating a down-sampled luma sample that is used to determine a predicted value of a chroma sample in a chroma block. For example, the filter circuit 102 is arranged to employ a weighting table for applying weighting to reconstructed luma samples included in a luma block (e.g., 2N×2N luma block BK_L) to generate a down-sampled luma sample, and the chroma intra-prediction circuit 106 is arranged to determine a predicted value of a chroma sample included in a chroma block (e.g., N×N chroma block BK_C) according to a linear model and the down-sampled luma sample.

Figure 7:
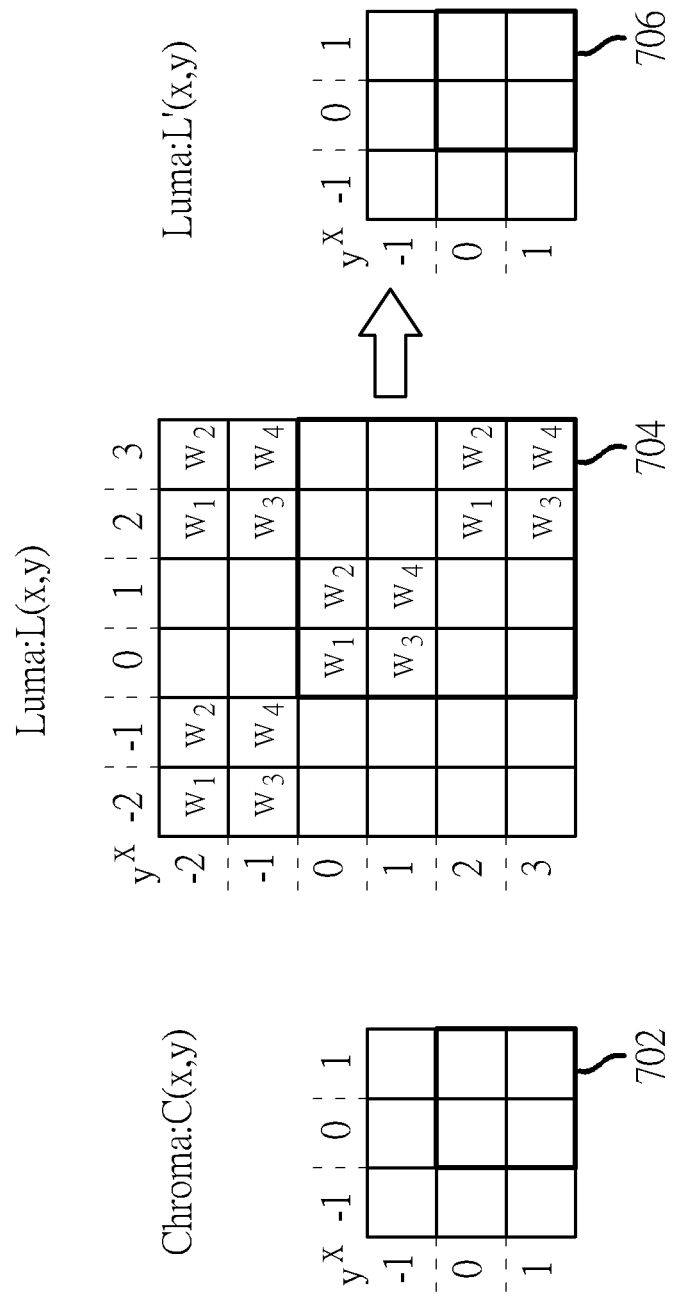
FIG. 7 is a diagram illustrating a weighting operation for generating a down-sampled luma sample according to an embodiment of the present invention.

As mentioned above, a weighting function is employed for generating a down-sampled luma sample that is involved in computing parameters ($\alpha$, $\beta$) of a linear model and/or a predicted value of a chroma sample included in a chroma block. FIG. 7 is a diagram illustrating a weighting operation for generating a down-sampled luma sample according to an embodiment of the present invention. In this embodiment, a block of video in YUV420 includes a 2×2 chroma block 702 and a 4×4 luma block 704 in YUV420. The 2×2 chroma block 702 includes chroma samples C(0, 0), C(1, 0), C(0, 1), C(1, 1). The 4×4 luma block 704 includes luma samples L(0, 0), L(1, 0), L(2, 0), L(3, 0), L(0, 1), L(1, 1), L(2, 1), L(3, 1), L(0, 2), L(1, 2), L(2, 2), L(3, 2), L(0, 3), L(1, 3), L(2, 3), and L(3, 3). For YUV420 sampling, one chroma sample C(x, y) corresponds to four luma samples L(2x, 2y), L(2x+1, 2y), L(2x, 2y+1), L(2x+1, 2y+1), where x,y$\in$Z. The present invention proposes using a weighting function for down-sampling one 2×2 luma block to generate a down-sampled luma sample. The computation of the down-sampled luma sample may be expressed using the following formula.

$$L'(x, y) = \frac{w_1 \times L(2x, 2y) + w_2 \times L(2x+1, 2y) + w_3 \times L(2x, 2y+1) + w_4 \times L(2x+1, 2y+1)}{w_1 + w_2 + w_3 + w_4}$$

The filter circuit 102 may be implemented using a 4-tap interpolator, where tap coefficients are set on the basis of the weighting table $\{w_1, w_2, w_3, w_4\}$. A down-sampled luma sample for a 2×2 block is generated by applying a first weighting value $w_1$ to a top left reconstructed luma sample, applying a second weighting value $w_2$ to a top right reconstructed luma sample, applying a third weighting value $w_3$ to a bottom left reconstructed luma sample, and applying a fourth weighting value $w_4$ to a bottom right reconstructed luma sample. Hence, the 4×4 luma block 704 can be converted into a down-sampled luma block 706 that matches the chroma resolution. The down-sampled luma block 706 includes down-sampled luma samples L' (0, 0), L' (1, 0), L' (0, 1), L' (1, 1). In addition, down-sampled luma samples L' (−1, −1), L' (−1, 0), L' (−1, 1), L' (0, −1), L' (1, −1) around the down-sampled luma block 706 are generated.

In a case where an L-shaped sample set is used for deriving parameters ($\alpha$, $\beta$) of a linear model needed by luma-based chroma intra-prediction of the 2×2 chroma block 702, the sample pairs {L' (−1, 1), C(−1, 1)}, {L' (−1, 0), C(−1, 0)}, {L' (−1, −1), C(−1, −1)}, {L' (0, −1), C(0, −1)}, {L' (1, −1), C(1, −1)} are used by the parameter derivation circuit 104 to compute the parameters ($\alpha$, $\beta$). After parameters ($\alpha$, $\beta$) of the linear model are determined, the chroma intra-prediction circuit 106 determines a predicted value of the chroma sample C(0, 1) according to the down-sampled luma sample L'(0, 1) and the linear model with parameters ($\alpha$, $\beta$), determines a predicted value of the chroma sample C(0, 0) according to the down-sampled luma sample L' (0, 0) and the linear model with parameters ($\alpha$, $\beta$), determines a predicted value of the chroma sample C(1, 1) according to the down-sampled luma sample L' (1, 1) and the linear model with parameters ($\alpha$, $\beta$), and determines a predicted value of the chroma sample C(1, 0) according to the down-sampled luma sample L' (1, 0) and the linear model with parameters ($\alpha$, $\beta$). The chroma intra-prediction can be expressed using the formula C(x, y)=$\alpha$×L'(x, y)+$\beta$, (x, y≥0).

In another case where a different sample set is used for deriving parameters ($\alpha$, $\beta$) of a linear model needed by luma-based chroma intra-prediction of the 2×2 chroma block 702, proper down-sampled luma samples are generated and selected. For example, only the down-sampled luma samples L' (0, −1) and L' (1, −1) located directly above the top boundary of the 4×4 luma block 704 (particularly, the top boundary of the down-sampled luma block 706) and only the reconstructed chroma samples C(0, −1) and C(1, −1) located directly above the top boundary of the 2×2 chroma block 702 are involved in deriving parameters ($\alpha$, $\beta$) of the linear model. In other words, only two sample pairs {L' (0, −1), C(0, −1)} and {L' (1, −1), C(1, −1)} are used by the parameter derivation circuit 104 to compute the parameters ($\alpha$, $\beta$). For another example, only the down-sampled luma samples L' (−1, 0) and L' (−1, 1) located directly left to the left boundary of the 4×4 luma block 704 (particularly, the left boundary of the down-sampled luma block 706) and only the reconstructed chroma samples C(−1, 0) and C(−1, 1) located directly left to the left boundary of the 2×2 chroma block 702 are involved in deriving parameters ($\alpha$, $\beta$) of the linear model. In other words, only two sample pairs {L' (−1, 0), C(−1, 0)} and {L' (−1, 1), C(−1, 1)} are used by the parameter derivation circuit 104 to compute the parameters ($\alpha$, $\beta$).

Figure 8:
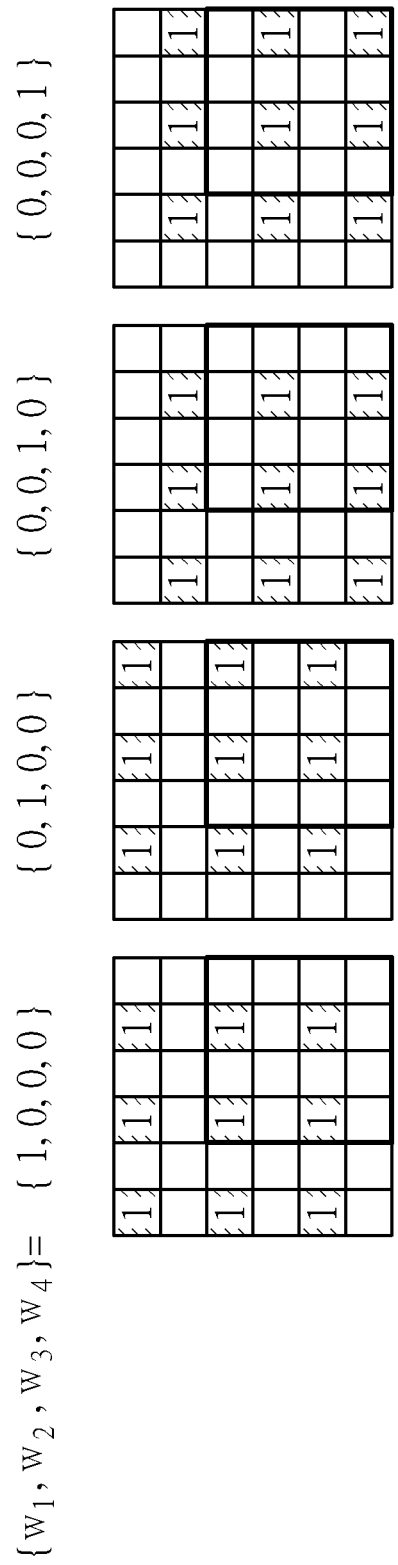
FIG. 8 is a diagram illustrating examples of a weighting table with a single non-zero value according to an embodiment of the present invention.
Figure 9:
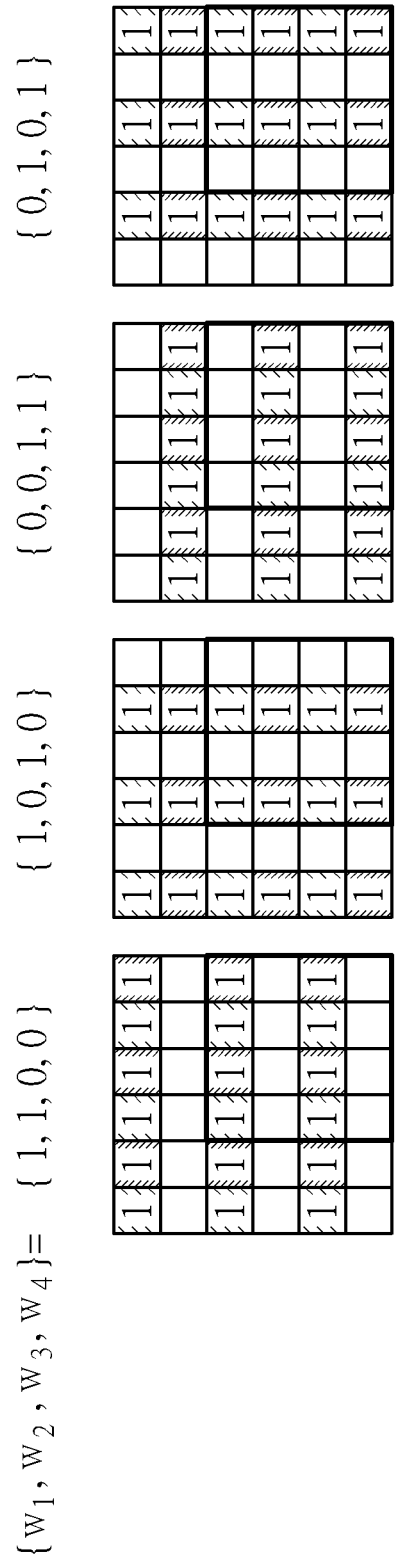
FIG. 9 is a diagram illustrating examples of a weighting table with two non-zero values according to an embodiment of the present invention.
Figure 10:
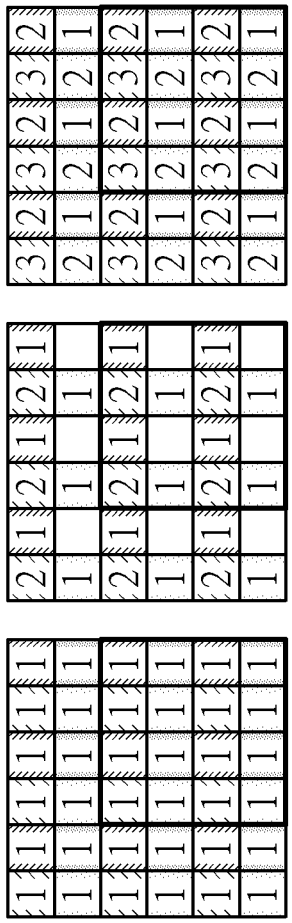
FIG. 10 is a diagram illustrating examples of a weighting table with more than two non-zero values according to an embodiment of the present invention.

In some embodiments of the present invention, a weighting table $\{w_1, w_2, w_3, w_4\}$ used by the filter circuit 102 to generate down-sampled luma samples (which are derived from reconstructed luma samples external to a luma block and are used for linear model parameter derivation) may be the same as a weighting table $\{w_1, w_2, w_3, w_4\}$ used by the filter circuit 102 to generate other down-sampled luma samples (which are derived from reconstructed luma samples included in the luma block and are used for chroma intra-prediction). FIG. 8 is a diagram illustrating examples of a weighting table $\{w_1, w_2, w_3, w_4\}$ with a single non-zero value according to an embodiment of the present invention. FIG. 9 is a diagram illustrating examples of a weighting table $\{w_1, w_2, w_3, w_4\}$ with two non-zero values according to an embodiment of the present invention. FIG. 10 is a diagram illustrating examples of a weighting table $\{w_1, w_2, w_3, w_4\}$ with more than two non-zero values according to an embodiment of the present invention.

In some embodiments of the present invention, the boundaries of coding tree units (CTUs) may be further referenced for controlling settings of different weighting tables $\{w_1, w_2, w_3, w_4\}$ that are used in different cases. For example, the setting of the weighting table $\{w_1, w_2, w_3, w_4\}$ may depend on a location of a 2N×2N luma block in a frame and a location of a CTU defined in the frame.

Figure 11:
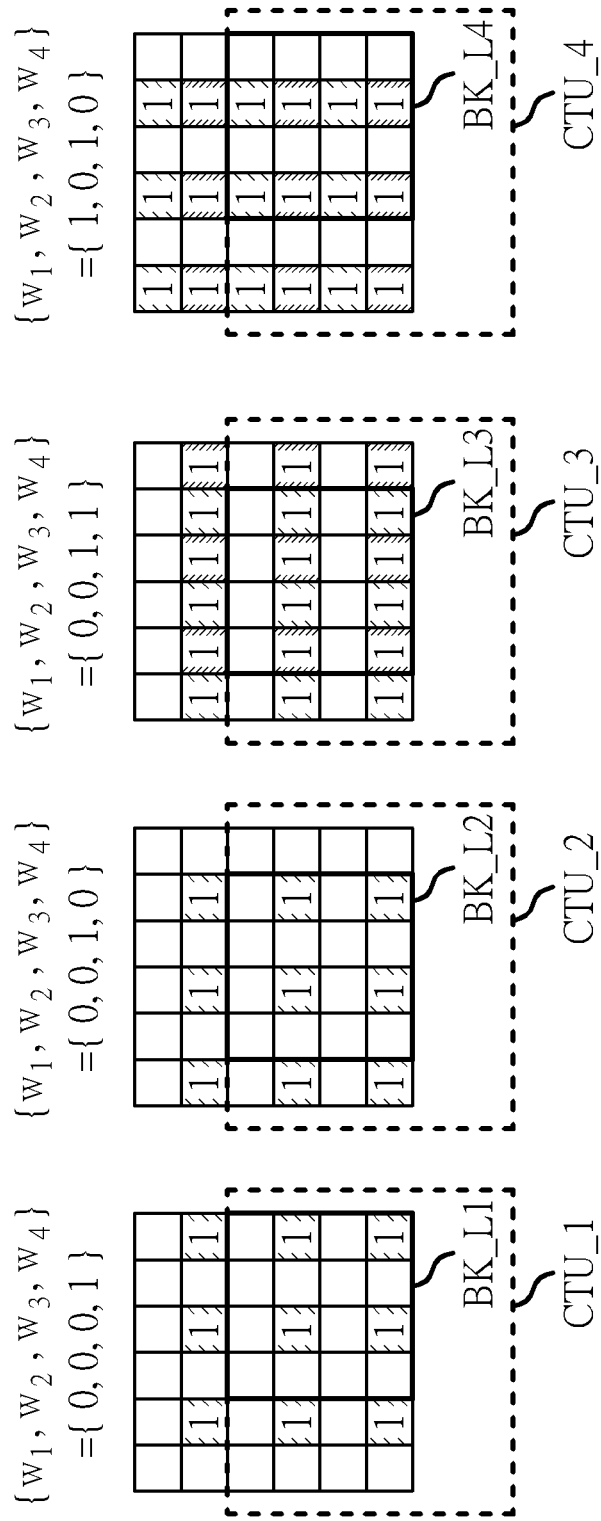
FIG. 11 is a diagram illustrating examples of different weighting tables used in different cases according to an embodiment of the present invention.

FIG. 11 is a diagram illustrating examples of different weighting tables $\{w_1, w_2, w_3, w_4\}$ used in different cases according to an embodiment of the present invention. One CTU is represented by a dash-lined block. As shown in FIG. 11, a top boundary of a 2N×2N luma block BK_L1 is aligned with a top boundary of a CTU (denoted by "CTU_1"). The weighting table $\{w_1, w_2, w_3, w_4\}$ is set by {0, 0, 0, 1}. Since only one reconstructed pixel line above the top boundary of the CTU (denoted by "CTU_1") is needed to be stored in one line buffer, the buffer requirement of luma-based chroma intra-prediction can be relaxed.

As shown in FIG. 11, a top boundary of a 2N×2N luma block BK_L2 is aligned with a top boundary of a CTU (denoted by "CTU_2"). The weighting table $\{w_1, w_2, w_3, w_4\}$ is set by {0, 0, 1, 0}. Since only one reconstructed pixel line above the top boundary of the CTU (denoted by "CTU_2") is needed to be stored in one line buffer, the buffer requirement of luma-based chroma intra-prediction can be relaxed.

As shown in FIG. 11, a top boundary of a 2N×2N luma block BK_L3 is aligned with a top boundary of a CTU (denoted by "CTU_3"). The weighting table {$w_1$, $w_2$, $w_3$, $w_4$} is set by {0, 0, 1, 1}. Since only one reconstructed pixel line above the top boundary of the CTU (denoted by "CTU_3") is needed to be stored in one line buffer, the buffer requirement of luma-based chroma intra-prediction can be relaxed.

As shown in FIG. 11, the 2N×2N luma block BK_L1 is fully inside a CTU (denoted by "CTU_4"). In this case, the weighting table {$w_1$, $w_2$, $w_3$, $w_4$} is set by {1, 0, 1, 0} that is different from any of the weighting tables {0, 0, 0, 1}, {0, 0, 1, 0}, and {0, 0, 1, 1} used in other cases.

Alternatively, a weighting table {$w_1$, $w_2$, $w_3$, $w_4$} used by the filter circuit 102 to generate down-sampled luma samples (which are derived from reconstructed luma samples external to a luma block and are used for linear model parameter derivation) may be different from a weighting table {$w_1$, $w_2$, $w_3$, $w_4$} used by the filter circuit 102 to generate other down-sampled luma samples (which are derived from reconstructed luma samples included in the luma block and are used for chroma intra-prediction). In some embodiments of the present invention, the boundaries of coding tree units (CTUs) may be referenced for controlling settings of different weighting tables {$w_1$, $w_2$, $w_3$, $w_4$} used in different cases.

Figure 12:
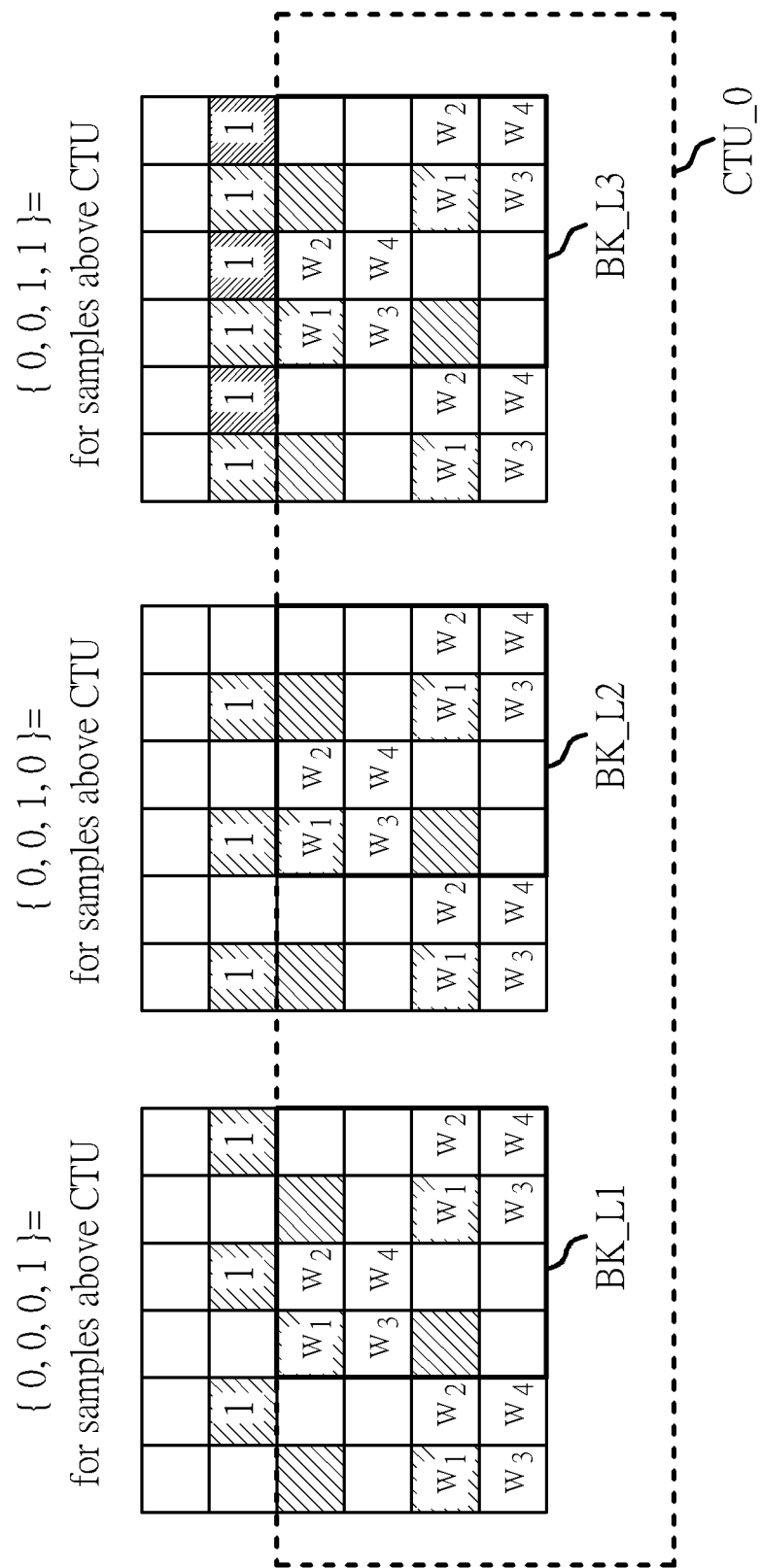
FIG. 12 is a diagram illustrating examples of different weighting tables used in different cases according to another embodiment of the present invention.

FIG. 12 is a diagram illustrating examples of different weighting tables {$w_1$, $w_2$, $w_3$, $w_4$} used in different cases according to another embodiment of the present invention. One CTU is represented by a dash-lined block. As shown in FIG. 12, a top boundary of a 2N×2N luma block BK_L1 is aligned with a top boundary of a CTU (denoted by "CTU_0"). The weighting table {$w_1$, $w_2$, $w_3$, $w_4$} is set by {0, 0, 0, 1} for reconstructed luma samples above the top boundary of the CTU, while a different weighting table {$w_1$, $w_2$, $w_3$, $w_4$} (i.e., {$w_1$, $w_2$, $w_3$, $w_4$}≠{0, 0, 0, 1}) is applied to reconstructed luma samples below the top boundary of the CTU. A top boundary of a 2N×2N luma block BK_L2 is aligned with the top boundary of the CTU. The weighting table {$w_1$, $w_2$, $w_3$, $w_4$} is set by {0, 0, 1, 0} for reconstructed luma samples above the top boundary of the CTU, while a different weighting table {$w_1$, $w_2$, $w_3$, $w_4$} (i.e., {$w_1$, $w_2$, $w_3$, $w_4$}≠{0, 0, 1, 0}) is applied to reconstructed luma samples below the top boundary of the CTU. A top boundary of a 2N×2N luma block BK_L3 is aligned with the top boundary of the CTU. The weighting table {$w_1$, $w_2$, $w_3$, $w_4$} is set by {0, 0, 1, 1} for reconstructed luma samples above the top boundary of the CTU, while a different weighting table {$w_1$, $w_2$, $w_3$, $w_4$} (i.e., {$w_1$, $w_2$, $w_3$, $w_4$}≠{0, 0, 1, 1}) is applied to reconstructed luma samples below the top boundary of the CTU. As shown in FIG. 12, only one reconstructed pixel line above the top boundary of the CTU (denoted by "CTU_0") is needed to be stored in one line buffer. In this way, the buffer requirement of luma-based chroma intra-prediction can be relaxed.

Figure 13:
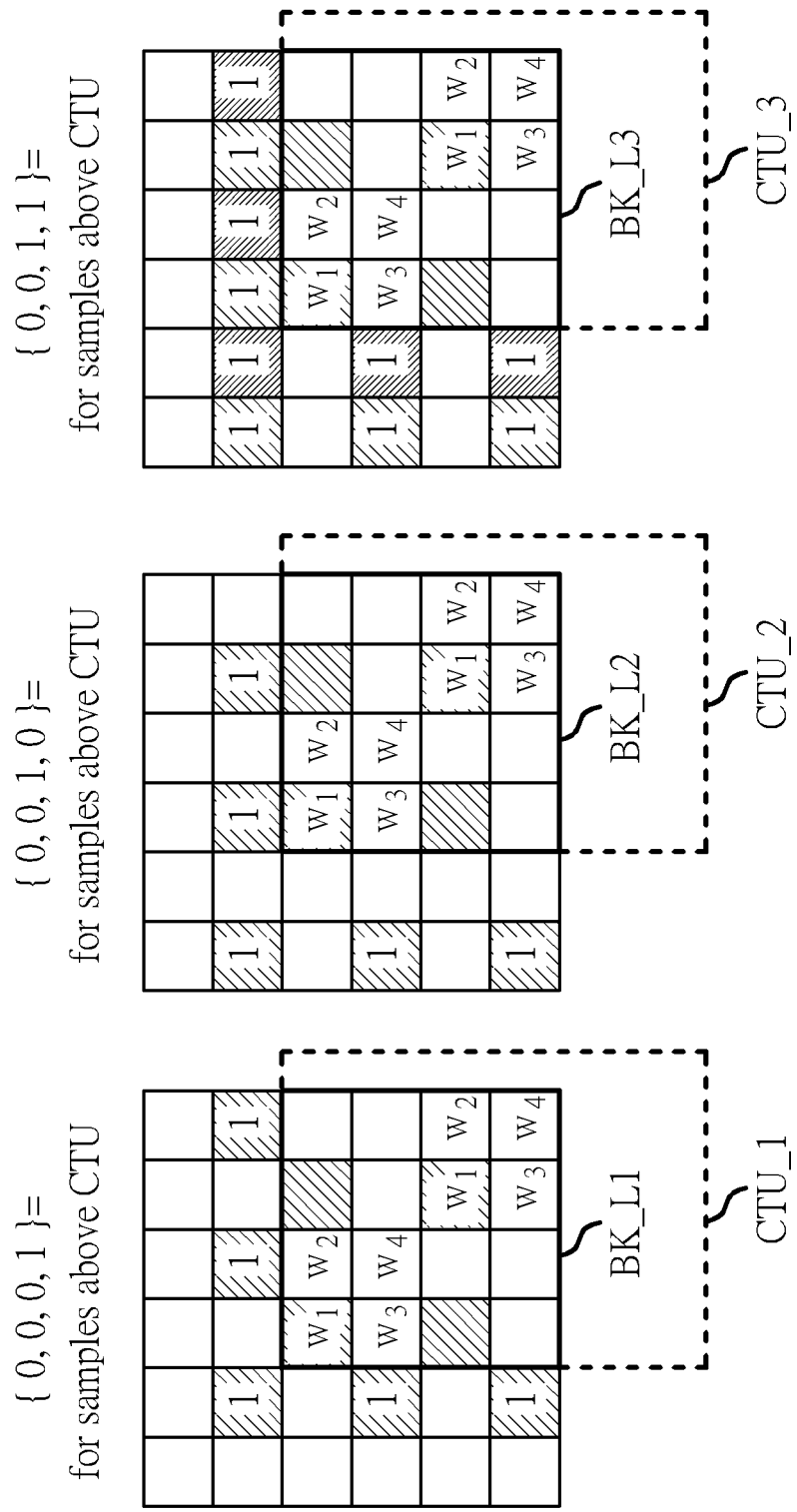
FIG. 13 is a diagram illustrating examples of different weighting tables used in different cases according to yet another embodiment of the present invention.

FIG. 13 is a diagram illustrating examples of different weighting tables {$w_1$, $w_2$, $w_3$, $w_4$} used in different cases according to yet another embodiment of the present invention. One CTU is represented by a dash-lined block. As shown in FIG. 13, a top boundary of a 2N×2N luma block BK_L1 is aligned with a top boundary of a CTU (denoted by "CTU_1"), and the left boundary of the 2N×2N luma block BK_L1 is aligned with the left boundary of the CTU (denoted by "CTU_1"). The weighting table {$w_1$, $w_2$, $w_3$, $w_4$} is set by {0, 0, 0, 1} for reconstructed luma samples outside the top boundary and the left boundary of the CTU, while a different weighting table {$w_1$, $w_2$, $w_3$, $w_4$} (i.e., {$w_1$, $w_2$, $w_3$, $w_4$}≠{0, 0, 0, 1}) is applied to reconstructed luma samples included in the 2N×2N luma block BK_L1 that is fully inside the CTU. Since only one reconstructed pixel line above the top boundary of the CTU (denoted by "CTU_1") is needed to be stored in one line buffer, the buffer requirement of luma-based chroma intra-prediction can be relaxed.

As shown in FIG. 13, a top boundary of a 2N×2N luma block BK_L2 is aligned with a top boundary of a CTU (denoted by "CTU_2"), and a left boundary of the 2N×2N luma block BK_L2 is aligned with a left boundary of the CTU (denoted by "CTU_2"). The weighting table {$w_1$, $w_2$, $w_3$, $w_4$} is set by {0, 0, 1, 0} for reconstructed luma samples outside the top boundary and the left boundary of the CTU, while a different weighting table {$w_1$, $w_2$, $w_3$, $w_4$} (i.e., {$w_1$, $w_2$, $w_3$, $w_4$}≠{0, 0, 1, 0}) is applied to reconstructed luma samples included in the 2N×2N luma block BK_L2 that is fully inside the CTU. Since only one reconstructed pixel line above the top boundary of the CTU (denoted by "CTU_2") is needed to be stored in one line buffer, the buffer requirement of luma-based chroma intra-prediction can be relaxed.

As shown in FIG. 13, a top boundary of a 2N×2N luma block BK_L3 is aligned with a top boundary of a CTU (denoted by "CTU_3"), and a left boundary of the 2N×2N luma block BK_L3 is aligned with a left boundary of the CTU (denoted by "CTU_3"). The weighting table {$w_1$, $w_2$, $w_3$, $w_4$} is set by {0, 0, 1, 1} for reconstructed luma samples outside the top boundary and the left boundary of the CTU, while a different weighting table {$w_1$, $w_2$, $w_3$, $w_4$} (i.e., {$w_1$, $w_2$, $w_3$, $w_4$}≠{0, 0, 1, 1}) is applied to reconstructed luma samples included in the 2N×2N luma block BK_L3 that is fully inside the CTU. Since only one reconstructed pixel line above the top boundary of the CTU (denoted by "CTU_3") is needed to be stored in one line buffer, the buffer requirement of luma-based chroma intra-prediction can be relaxed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A luma-based chroma intra-prediction method comprising:
   applying, by a filter circuit with a first weighting table, weighting to reconstructed luma samples to generate a first down-sampled luma sample, wherein the reconstructed luma samples are external to a luma block;
   computing parameters of a linear model, wherein a pair of the first down-sampled luma sample and a reconstructed chroma sample that is external to a chroma block is involved in computing the parameters of the linear model; and
   determining a predicted value of a chroma sample included in the chroma block according to the linear model and a second down-sampled luma sample that is derived from the luma block;
   wherein a top boundary of the luma block is aligned with a top boundary of a coding tree unit (CTU); a 2×2 block that consists of the reconstructed luma samples is located above the top boundary of the CTU; the first weighting table includes a first weighting value, a second weighting value, a third weighting value, and a fourth weighting value; and applying weighting to the reconstructed luma samples to generate the first down-sampled luma sample comprises:

applying the first weighting value of the first weighting table to a top left reconstructed luma sample in the 2×2 block;
applying the second weighting value of the first weighting table to a top right reconstructed luma sample in the 2×2 block;
applying the third weighting value of the first weighting table to a bottom left reconstructed luma sample in the 2×2 block; and
applying the fourth weighting value of the first weighting table to a bottom right reconstructed luma sample in the 2×2 block;
wherein the first weighting value, the second weighting value, the third weighting value, and the fourth weighting value are set by {0, 0, 0, 1} or {0, 0, 1, 0}.

2. The luma-based chroma intra-prediction method of claim 1, further comprising:
applying, by the filter circuit with the first weighting table, weighting to reconstructed luma samples included in the luma block to generate the second down-sampled luma sample.

3. The luma-based chroma intra-prediction method of claim 2, wherein another 2×2 block that consists of the reconstructed luma samples included in the luma block includes a top left reconstructed luma sample, a top right reconstructed luma sample, a bottom left reconstructed luma sample, and a bottom right reconstructed luma sample; and applying weighting to the reconstructed luma samples included in the luma block comprises:
generating the second down-sampled luma sample for said another 2×2 block by:
applying the first weighting value of the first weighting table to the top left reconstructed luma sample in said another 2×2 block;
applying the second weighting value of the first weighting table to the top right reconstructed luma in said another 2×2 block;
applying the third weighting value of the first weighting table to the bottom left reconstructed luma sample in said another 2×2 block; and
applying the fourth weighting value of the first weighting table to the bottom right reconstructed luma sample in said another 2×2 block.

4. The luma-based chroma intra-prediction method of claim 1, further comprising:
applying, by the filter circuit with a second weighting table, to reconstructed luma samples included in the luma block to generate the second down-sampled luma sample, wherein the second weighting table is different from the first weighting table.

5. The luma-based chroma intra-prediction method of claim 4, wherein another 2×2 block that consists of the reconstructed luma samples included in the luma block includes a top left reconstructed luma sample, a top right reconstructed luma sample, a bottom left reconstructed luma sample, and a bottom right reconstructed luma sample; the second weighting table includes a first weighting value, a second weighting value, a third weighting value, and a fourth weighting value; and applying weighting to the reconstructed luma samples included in the luma block comprises:
generating the second down-sampled luma sample for said another 2×2 block by:
applying the first weighting value of the second weighting table to the top left reconstructed luma sample in said another 2×2 block;
applying the second weighting value of the second weighting table to the top right reconstructed luma in said another 2×2 block;
applying the third weighting value of the second weighting table to the bottom left reconstructed luma sample in said another 2×2 block; and
applying the fourth weighting value of the second weighting table to the bottom right reconstructed luma sample in said another 2×2 block.

6. A luma-based chroma intra-prediction method comprising:
applying, by a filter circuit with a weighting table, weighting to reconstructed luma samples included in a luma block to generate a down-sampled luma sample; and
determining a predicted value of a chroma sample included in a chroma block according to a linear model and the down-sampled luma sample;
wherein a top boundary of the luma block is aligned with a top boundary of a coding tree unit (CTU); a 2×2 block that consists of reconstructed luma samples is located above the top boundary of the CTU; and the luma-based chroma intra-prediction method further comprises:
applying weighting to the reconstructed luma samples in the 2×2 block to generate another down-sampled luma sample that is involved in computing parameters of the linear model, comprising:
applying a first weighting value to a top left reconstructed luma sample in the 2×2 block;
applying a second weighting value to a top right reconstructed luma sample in the 2×2 block;
applying a third weighting value to a bottom left reconstructed luma sample in the 2×2 block; and
applying a fourth weighting value to a bottom right reconstructed luma sample in the 2×2 block;
wherein the first weighting value, the second weighting value, the third weighting value, and the fourth weighting value are set by {0, 0, 0, 1} or {0, 0, 1, 0}.

7. The luma-based chroma intra-prediction method of claim 6, wherein another 2×2 block that consists of the reconstructed luma samples in the luma block includes a top left reconstructed luma sample, a top right reconstructed luma sample, a bottom left reconstructed luma sample, and a bottom right reconstructed luma sample; the weighting table includes four weighting values; and applying weighting to the reconstructed luma samples included in the luma block comprises:
generating the down-sampled luma sample for said another 2×2 block by:
applying the four weighting values to the top left reconstructed luma sample, the top right reconstructed luma, the bottom left reconstructed luma sample, and the bottom right reconstructed luma sample, respectively.

8. A luma-based chroma intra-prediction method comprising:
computing parameters of a linear model by utilizing only N down-sampled luma samples that are derived from reconstructed luma samples external to a 2N×2N luma block and only N reconstructed chroma samples that are external to an N×N chroma block, where N is a positive integer;
determining predicted values of chroma samples included in the N×N chroma block according to the linear model and down-sampled luma samples that are derived from the 2N×2N luma block;

wherein a top boundary of the 2N×2N luma block is aligned with a top boundary of a coding tree unit (CTU); a 2×2 block that consists of reconstructed luma samples is located above the top boundary of the CTU; a weighting table includes a first weighting value, a second weighting value, a third weighting value, and a fourth weighting value; and the luma-based chroma intra-prediction method further comprises:
applying, by a filter circuit with the weighting table, weighting to the reconstructed luma samples in the 2×2 block to generate one of the N down-sampled luma samples, comprising:
applying the first weighting value to a top left reconstructed luma sample in the 2×2 block;
applying the second weighting value to a top right reconstructed luma sample in the 2×2 block;
applying the third weighting value to a bottom left reconstructed luma sample in the 2×2 block; and
applying the fourth weighting value to a bottom right reconstructed luma sample in the 2×2 block;
wherein the first weighting value, the second weighting value, the third weighting value, and the fourth weighting value are set by {0, 0, 0, 1} or {0, 0, 1, 0}.

9. The luma-based chroma intra-prediction method of claim 8, wherein all of the N reconstructed chroma samples are located directly above a top boundary of the N×N chroma block, and all of the reconstructed luma samples are located directly above a top boundary of the 2N×2N luma block.

10. A luma-based chroma intra-prediction apparatus comprising:
a filter circuit, arranged to employ a first weighting table for applying weighting to reconstructed luma samples to generate a first down-sampled luma sample, wherein the reconstructed luma samples are external to a luma block; and
a parameter derivation circuit, arranged to compute parameters of a linear model, wherein a pair of the first down-sampled luma sample and a reconstructed chroma sample that is external to a chroma block is involved in computing the parameters of the linear model; and
a chroma intra-prediction circuit, arranged to determine a predicted value of a chroma sample included in the chroma block according to the linear model and a second down-sampled luma sample that is derived from the luma block;
wherein a top boundary of the luma block is aligned with a top boundary of a coding tree unit (CTU); a 2×2 block that consists of the reconstructed luma samples is located above the top boundary of the CTU; the first weighting table includes a first weighting value, a second weighting value, a third weighting value, and a fourth weighting value; and the filter circuit applies weighting to the reconstructed luma samples by:
applying the first weighting value of the first weighting table to a top left reconstructed luma sample in the 2×2 block;
applying the second weighting value of the first weighting table to a top right reconstructed luma sample in the 2×2 block;
applying the third weighting value of the first weighting table to a bottom left reconstructed luma sample in the 2×2 block; and
applying the fourth weighting value of the first weighting table to a bottom right reconstructed luma sample in the 2×2 block;
wherein the first weighting value, the second weighting value, the third weighting value, and the fourth weighting value are set by {0, 0, 0, 1} or {0, 0, 1, 0}.

11. A luma-based chroma intra-prediction apparatus comprising:
a filter circuit, arranged to employ a weighting table for applying weighting to reconstructed luma samples included in a luma block to generate a down-sampled luma sample; and
a chroma intra-prediction circuit, arranged to determine a predicted value of a chroma sample included in a chroma block according to a linear model and the down-sampled luma sample;
wherein a top boundary of the luma block is aligned with a top boundary of a coding tree unit (CTU); a 2×2 block that consists of reconstructed luma samples is located above the top boundary of the CTU; and the filter circuit is further arranged to apply weighting to the reconstructed luma samples in the 2×2 block to generate another down-sampled luma sample that is involved in computing parameters of the linear model, by:
applying a first weighting value to a top left reconstructed luma sample in the 2×2 block;
applying a second weighting value to a top right reconstructed luma sample in the 2×2 block;
applying a third weighting value to a bottom left reconstructed luma sample in the 2×2 block; and
applying a fourth weighting value to a bottom right reconstructed luma sample in the 2×2 block;
wherein the first weighting value, the second weighting value, the third weighting value, and the fourth weighting value are set by {0, 0, 0, 1} or {0, 0, 1, 0}.

* * * * *